May 5, 1970 E. BRAUN 3,510,678

ARRANGEMENT WITH CIRCUIT NETWORKS BUILT UP IN INTEGRATED CIRCUIT TECHNIQUE

Filed March 31, 1967 2 Sheets-Sheet 1

INVENTOR
Ewald Braun

BY Spiel & Spiel
ATTYS.

INVENTOR
Ewald Braun

BY Spiee & Spiee

ATTYS.

United States Patent Office 3,510,678

Patented May 5, 1970

3,510,678

ARRANGEMENT WITH CIRCUIT NETWORKS BUILT UP IN INTEGRATED CIRCUIT TECHNIQUE

Ewald Braun, Munich, Germany, assignor to Siemens Aktiengesellschaft, a corporation of Germany Filed Mar. 31, 1967, Ser. No. 627,520

Claims priority, application Germany, Apr. 1, 1966, S 102,994

Int. Cl. H02k 7/20

U.S. Cl. 307—202 13 Claims

ABSTRACT OF THE DISCLOSURE

A circuit network built up in integrated circuit technique, especially power repeaters, particularly for use on coaxial lines, wherein the circuit network is disposed in a tube, the diameter of which corresponds approximately to the outer diameter of the associated coaxial lines, the feed current supply being effected over at least two sections of the tube, which sections are connected by a Zener diode, which in operation is connected in parallel with the currrent supply terminals of such circuit network.

The invention relates to an arrangement with circuit networks built up in integrated circuit technique, especially in connection with power amplifiers, particularly for use on coaxial lines.

The use of transistors instead of tubes as active elements in apparatus of communications technology have brought about a large number of fundamental changes in design and in the electric circuits. Also the ancillary functions such as regulation, remote supply and monitoring have been decisively influenced by the maintenance free transistor.

With the so-called integrated circuit networks in thin film technique or on a monolithic basis ever gaining greater and more importance, the volume is still further reduced, moreover, so that, for example, in a multistage amplifier, it is reduced to less than one cubic centimeter. A special feature of these circuits is that efforts are made to omit inductances and large capacitances.

For the transmission of signals to lines over relatively great distances repeaters were needed at regular intervals. Nowadays semiconductors are predominately utilized therefor, for example, transistors.

New types of construction with respect to housing, regulation, remote feed, fault location, etc. were introduced by the virtually maintenance-free transistor into the technology of transmission on lines.

The observation may be noted that in the course of the many decades with increasing powers the systems have become smaller and smaller.

The progressive reduction in size, however, is not to be ascribed exclusively to the advent of the transistor. The other necessary structural elements, such as resistors, capacitors, coils, etc., likewise have diminished appreciably in size in the course of the years. In this context circuit networks built up in integrated circuits techniques are particularly interesting.

In such so-called integrated circuit networks there are produced, based on the use of semiconducting materials largely complete multistage amplifiers with all the necessary circuit accessories.

A typical feature of this new amplifier technique resides in the fact that it is necessary to virtually completely eliminate inductances and large copacitances. This holds true both in the use of monolithic and also of the thin film technique in the construction of such circuit networks.

With the integrated circuit networks which predominately contain only transistors, diodes, resistors and capacitors of small capacitance value, efforts are made to achieve results comparable to those heretofore realized with conventional structural parts. It is assumed that the number of the circuit elements contained in an integrated circuit network has no influence on the dependability, the dependability of the whole system being determined rather by the purity of the material used, its size, the number of production processes of the whole circuit and the number of terminal connections.

These new amplifiers, accordingly present, with the smallest space requirement, prospectively such a high degree of reliability as is familiar today in the use of silicon planar transistors.

It is the problem of the present invention to create an arrangement by which the expenditure in constrtuction of communication transmission systems is still further reduced and the construction itself is simplified and accelerated without loss in dependability.

The arrangement according to the invention is designed in such a way that the circuit networks, built up in integrated circuit technology, are arranged in a tube, the diameter of which corresponds aprpoximately to the external diameter of associated coaxial lines, with the feed current supply for the circuit network taking place over the tube, which is subdivided into at least two sections, connected with one another over Zener diodes, also constructed in tubular form, which are connected in parallel with the current supply terminals of the circuit networks.

Through this measure there is achieved the advantage that such an amplifier requires no special container of any kind for its accommodation. Instead, it fits in any sleeve or can be installed even directly in the cable itself. Through the special manner in which the direct feed current is supplied, coils in current supply filters can be bypassed or such filters can be completely omitted. Since the remote feed current and possibly superimposed inductive influencing current flows in each case over a Zener diode in parallel with the current supply terminals of the amplifier, the amplifier is immediately protected from such harmful currents and its supply voltage is stabilized. Through the design of the diode utilized in the coaxial lines the coaxial structure of the entire system is not interrupted at any point. Furthermore, such arrangements, for example, constructed as amplifiers, can be installed directly in the cable during cable production so that whole cable sections can be produced with an attenuation of 0. Prospectively occurring distortion thus can be precisely determined at the place of manufacture. Further, the assembling work required in cable laying thereby can be simplified and the time for installation can be appreciably reduced.

In a further development of the invention, at the two ends of the tube coaxially constructed overload voltage diverters can be permanently installed, whereby the particular circuit networks are protected from excessive voltages such as may arise through the vicinity of high voltage lines, lighting bolts and the like. The tubularly constructed Zener diode expediently can be so designed that the one tube section is somewhat reduced in diameter at its free end and inserted in concentric relation into the adjacent end of the other tube section with the resulting interspace being filled with semiconductor material. In a similar manner, by introducing dielectric material into such interspace capacitors also can be realized. For the purpose of assembling, the tube can expediently be subdivided into several sections, the trailing ends of the particular tube sections and the leading of the following tube sections again being constructed in the manner above described. The individual tube sections, therefore, can be successively connected, one within the other. Instead of the disposition of a semiconductor in the resulting interspace it is possible where desired to arrange an external thread on the end of the one tube section and an internal thread on the cooperable tube end. Another possibility consists in constructing mating ends of adjacent tubes of about equal diameter, providing both tubes with internal or external threads and connecting them in each case with cooperable external or internal sleeves in electrical conduction. If the trailing end of the one tube section is provided with an internal thread and the leading end of the other tube section is in each case provided with an external thread, it is possible in a simple manner to achieve a good mechanical connection. For balancing the voltage potential between inner and outer conductors of the coaxial system both poles of the particular circuit networks, in each case connected with the external and internal conductors of a coaxial cable can be bridged by a high ohmic resistor. One of these poles of the circuit network can simultaneously be used for the supplying of the feed current. If need be there can be used in the tube components produced in conventional technology, such as ohmic resistors and the like. In order to assure an automatic level regulation, a temperature-dependent control device for the arrangement according to the invention can also be provided.

The invention is explained in detail with the aid of the examples of construction illustrated in the drawings, wherein like reference characters indicate like or corresponding parts, and in which.

Figure 1:
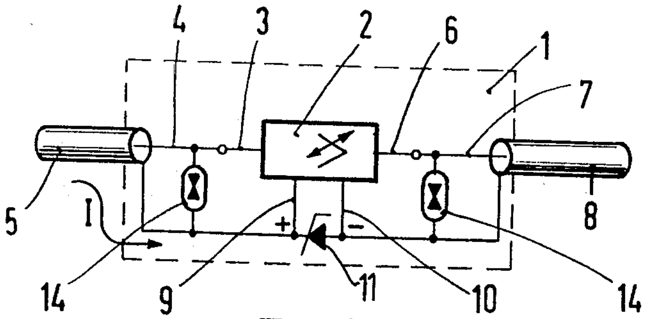
FIG. 1 is a schematic diagram of a line amplifier embodying the invention.

Referring to FIG. 1, the line amplifier or repeater 1 contains therein the integrated amplifier part 2, the input line 3 of which is connected to the inner conductor 4 of the coaxial line 5, and the output line 6 therefrom being connected to the inner conductor 7 of the coaxial line 8. The current supply connections 9 and 10 for the amplifier part 2 are in parallel with the Zener diode 11, which in turn is connected in series with the outer conductors of the lines 5 and 8. The current supply lines 9 and 10 also simultaneously form the so-called cold HF connections for the input and output, respectively.

The supply current I, a direct current, flows on the outer coductor of the coaxial line, flowing through the ionized Zener diode 11 and passes to the next repeater. There is present, accordingly, a series feed over the outer conductors. In a cable with several coaxial lines all the outer conductors should be well insulated with respect to one another and with respect to ground. Two tubes, each with appertaining amplifiers form the remote feed circuit for a four-wire system. The voltage drop at the Zener diode is determinative for the feed voltage of the amplifier.

Figure 1A:
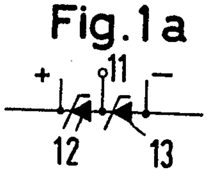
FIG. 1*a* is a modification thereof.

If the integrated amplifier should require for its operation two voltages of positive and negative polarity with respect to a mid point, two Zener diodes 12, 13 may be connected in series, as illustrated in FIG. 1*a*.

An ionized Zener diode series, on the one hand, stabilize the supply voltage, and, on the other hand, effectively protects the amplifier through its low dynamic resistance with respect to induced influencing currents which may be superimposed on the remote direct feed current.

For protection with respect to excess voltages in the cable, such as may arise, for example, on the striking of lightning, there may be provided overload voltage surge diverters 14 and diodes, which diodes can also be part of the integrated circuit.

The repeater has an amplification rising with growing frequency, which may be utilized or the distortion correction of frequency-dependent line attenuations, through corresponding frequency-dependent feedback, by means of RC members within or external to the integrated network. The temperature course of the line is suitably maintained according to the principle of temperature control, with values of the structural parts dependent on the environmental temperature in the circuit controlling the amplification in a defined manner.

Figure 2:
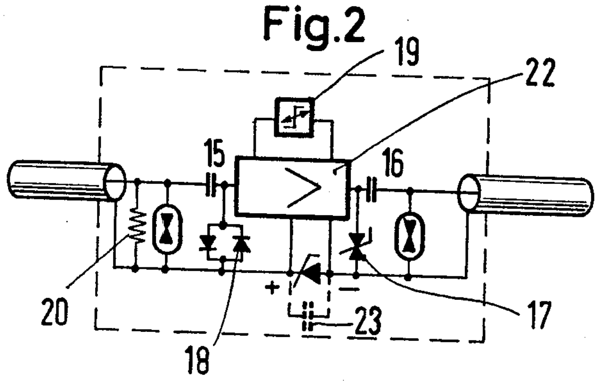
FIG. 2 is a similar figure illustrating further features of the invention.

FIG. 2 illustrates a line amplifier embodying a modified construction, in which is provided an integrated network 22, within which coupling members are not included. Capacitors 15, 16 connected externally of the network, lightning protective devices 17, 18, and a feedback network 19 complete the line amplifier. It will be noted with respect to feeding supply current over the outer conductor that the overload voltage surge diverters are not loaded by the remote feed supply voltage. Their response voltage thus can be kept as low as is technically possible. A high-ohmic resistor 20 places the inner conductor on the same potential as the corresponding outer conduction section.

Figure 3:
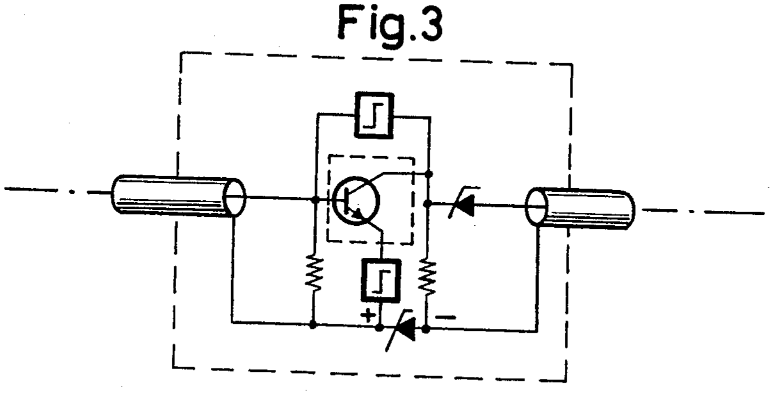
FIG. 3 is a figure, similar to FIG. 2, illustrating a circuit which does not require coupling capacitors.

The diagram of FIG. 3 illustrates one way it is possible to proceed without coupling capacitors.

Figure 4:
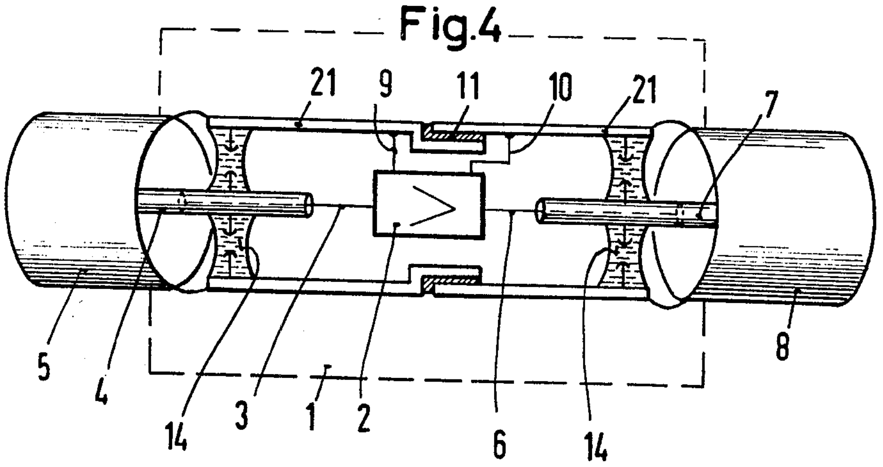
FIG. 4 is a semi-diagrammatic figure illustrating details of construction of a line amplifier or repeater embodying the invention.

The constructional form of a repeater according to the invention is illustrated in FIG. 4. All the elements are housed in a tube 21, which has about the same diameter as the coaxial line. The current supply Zener diode subdivides the pipe into two parts, with semiconductive material 11 of the diode connecting the individual tubes. There is thus provided a large-surface, having a protective diode capable of accommodating great overloads. The continuous coaxial construction largely prevents external disturbances, for example alien interferences, from passing into the transmission circuit. The overload voltage surge diverters 14 are arranged concentrically at the two ends of the tube.

Figure 5:
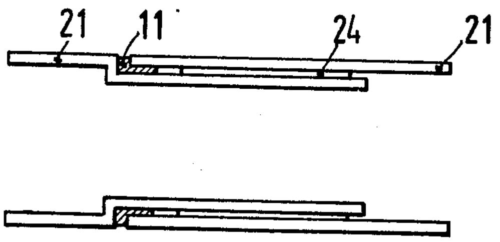
FIG. 5 is a longitudinal section of the mating ends of a pair of tube sections.

In order to also keep the transmission resistance between the two tube halves 21 low for high interference influencing frequencies, FIG. 5 illustrates construction of the diode of semi-conductor material 11 with a concentrically constructed capacitor lying parallel with it. The two tube ends 21 are concentrically arranged one within the other and form the plates of a capacitor between which there is disposed dielectric material 24 (for example a tantalum electrolyte). In the arrangement according to FIG. 2 a similar capacitor 23 is indicated in broken lines.

Figure 6:
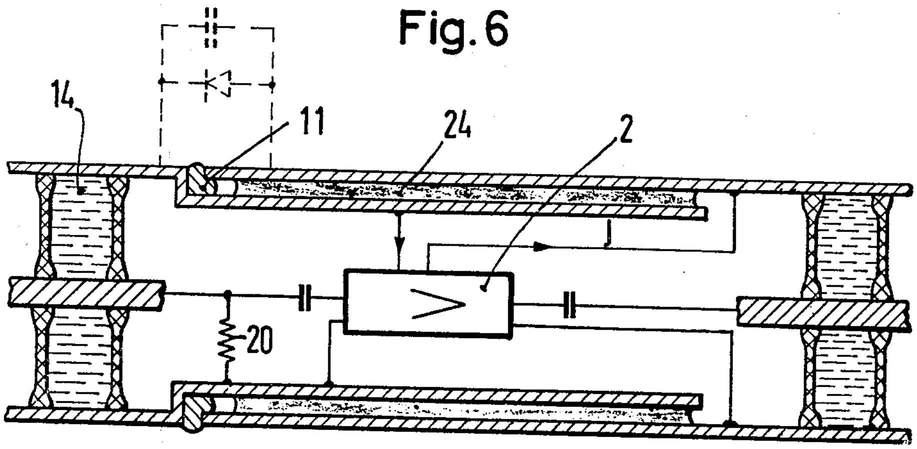
FIG. 6 is a section similar to FIG. 5 illustrating a complete assembly.

A further example of construction is illustrated in FIG. 6, in which parts corresponding to elements in the other figures, are similarly designated.

Repeaters constructed in this manner can, for example, be soldered directly into the line, and since they require no more space than the line itself, special amplifier sleeves are no longer needed.

Finally, it is possible to directly install such amplifiers in the course of manufacture of the cables or even of the tubes and to lay repeater field lengths, including amplifiers, as "de-attenuated" cables.

If lines and repeaters are already joined in the cable production, distortion faults occurring can easily be detected and additional connection means, possibly desirable at relatively greater intervals can be provided in advance. Although the arrangement according to the present invention can be applied especially advantageously to coaxial lines, it also can be used for other types of lines, if necessary by suitable adaptation to another technique of transmission which may be involved.

Changes may be made within the scope and spirit of the appended claims which define what is believed to be new and desired to have protected by Letters Patent.

I claim:

1. Apparatus for use with a coaxial cable including inner and outer conductors for carrying transmission signals and supply current, comprising an integrated circuit having a transmission signal input connected to the inner coaxial conductor and a transmission output connected to the inner coaxial conductor and a power supply input including a pair of input terminals, an electrically conductive tubular housing connected to the outer coaxial conductor and enclosing said integrated circuit and having an outer diameter corresponding to the outer diameter of the coaxial cable, said housing including two sections disposed in overlapping relation to form a space therebetween, each of said power supply input terminals of said integrated circuit connected to separate ones of said housing sections, and at least one tubular Zener diode disposed in the space between said housing sections and having its outer surface contacting the outermost section and its inner surface contacting the innermost section to provide said supply terminals with a stabilized voltage in response to current flow over the outer coaxial conductor.

2. Apparatus according to claim 1, comprising an over-voltage diverter device connected in parallel with said transmission signal input and formed at one end of said housing between the corresponding housing section and the inner conductor of the coaxial cable.

3. Apparatus according to claim 1, comprising an over-voltage diverter device connected in parallel with said transmission signal output and formed at one end of said housing between the corresponding housing section and the inner conductor of the coaxial cable.

4. Apparatus according to claim 1, comprising a plurality of said tubular housings, each including therein a corresponding integrated circuit, a first housing section of each of said housings having an outer diameter at its free end substantially as the inner diameter of the free end of the second housing section of another of said housings and disposed therein in electrical contact therewith.

5. Apparatus according to claim 4, wherein said first housing sections include a threaded portion on the outer surface thereof and said second sections include threaded portions on the inner surfaces thereof for engaging the corresponding threaded portions of said first housing sections.

6. Apparatus according to claim 1, comprising a plurality of said tubular housings each including therein a corresponding integrated circuit, said plurality of tubular housings being disposed in an end-to-end relation, and comprising a plurality of electrically conductive sleeves for mechanically and electrically connecting adjacent ends of said housings.

7. Apparatus according to claim 1, wherein said integrated circuit is a switching circuit including two poles, one of said poles connected to the inner conductor of the coaxial cable and the other pole with the outer conductor of the coaxial cable.

8. Apparatus according to claim 7, wherein the pole of the switching circuit connected to the outer conductor of the coaxial cable is simultaneously one of said power supply terminals.

9. Apparatus according to claim 1, comprising a dielectric material disposed in the space between said two housing sections adjacent to and electrically parallel with said tubular Zener diode.

10. Apparatus according to claim 1, comprising an over-voltage diverter device connected in parallel with said transmission signal input and formed at one end of said housing between the corresponding housing sections and the inner conductor of the coaxial cable, and diode means connected in parallel to said over-voltage diverter device.

11. Apparatus according to claim 10, wherein said diode means is included in said integrated circuit.

12. Apparatus according to claim 1, comprising an over-voltage diverter device connected in parallel with said transmission signal output and formed at one end of said housing between the corresponding housing section and the inner conductor of the coaxial cable, and diode means connected in parallel with said over-voltage diverter device.

13. Apparatus according to claim 12, wherein said diode means is included in said integrated circuits.

References Cited

UNITED STATES PATENTS

| | | | |
|---|---|---|---|
| 2,976,462 | 3/1961 | Miller | 328—7 |
| 3,082,300 | 3/1963 | Partridge | 179—170 |
| 3,176,250 | 3/1965 | Marchand | 333—81 |
| 3,382,464 | 5/1968 | Gremillet | 333—97 |
| 3,436,689 | 4/1969 | Fluhr | 307—293 |
| 3,421,122 | 1/1969 | Ito et al. | 333—97 |

JOHN S. HEYMAN, Primary Examiner

D. M. CARTER, Assistant Examiner

U.S. Cl. X.R.

307—302